United States Patent
Peisa et al.

(10) Patent No.: US 12,284,558 B2
(45) Date of Patent: *Apr. 22, 2025

(54) WIRELESS HANDOVER

(71) Applicant: TELEFONAKTIEBOLAGET LM ERICSSON (PUBL), Stockholm (SE)

(72) Inventors: Janne Peisa, Espoo (FI); Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,604

(22) Filed: Dec. 24, 2023

(65) Prior Publication Data
US 2024/0129815 A1   Apr. 18, 2024

Related U.S. Application Data

(63) Continuation of application No. 17/501,618, filed on Oct. 14, 2021, now Pat. No. 11,856,466, which is a
(Continued)

(51) Int. Cl.
*H04W 36/08* (2009.01)
*H04W 36/00* (2009.01)
*H04W 74/0833* (2024.01)

(52) U.S. Cl.
CPC ... *H04W 36/0072* (2013.01); *H04W 36/0077* (2013.01); *H04W 36/085* (2023.05); *H04W 74/0833* (2013.01)

(58) Field of Classification Search
CPC ......... H04W 36/0072; H04W 36/0077; H04W 36/085; H04W 74/0833; H04W 16/28
See application file for complete search history.

(56) References Cited

U.S. PATENT DOCUMENTS 9,699,825 B2   7/2017 Lee et al.
9,763,151 B2   9/2017 Kim
(Continued)

FOREIGN PATENT DOCUMENTS

CN   101690321 B   11/2014
CN   107659947 A * 2/2018 ............ H04W 24/00
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.10.0 (Jun. 2016), 465 Pages.
(Continued)

*Primary Examiner* — Jay P Patel
(74) *Attorney, Agent, or Firm* — Ericsson Inc.

(57) ABSTRACT

In accordance with particular embodiments, there is disclosed herein a method performed by a wireless device for handover. The method comprises receiving a first handover message from a source network node associated with a source cell. The first handover message comprises an identification of a target cell and access information associated with the target cell. The target cell is different than the source cell and comprises one or more beams. The method also includes identifying at least one beam from among the one or more beams of the target cell. The at least one beam is identified based on the identification of the target cell and the access information from the first handover message. The method further includes accessing the target cell using the identified at least one beam.

17 Claims, 7 Drawing Sheets

Related U.S. Application Data continuation of application No. 16/672,464, filed on Nov. 3, 2019, now Pat. No. 11,178,587, which is a continuation of application No. 16/211,399, filed on Dec. 6, 2018, now Pat. No. 10,484,915, which is a continuation of application No. PCT/IB2017/056880, filed on Nov. 3, 2017.

(60) Provisional application No. 62/417,714, filed on Nov. 4, 2016.

(56) References Cited

U.S. PATENT DOCUMENTS

| | | | |
|---|---|---|---|
| 9,769,717 B2* | 9/2017 | Park | H04B 7/0408 |
| 9,788,358 B2 | 10/2017 | Pelletier et al. | |
| 9,888,424 B2 | 2/2018 | Basu Mallick et al. | |
| 10,009,952 B2 | 6/2018 | Kim | |
| 10,542,469 B2 | 1/2020 | Kang et al. | |
| 10,638,331 B2 | 4/2020 | Ryoo et al. | |
| 10,879,964 B2 | 12/2020 | Mu et al. | |
| 11,395,169 B2* | 7/2022 | Zhang | H04W 16/28 |
| 11,425,623 B2 | 8/2022 | Kubota et al. | |
| 12,047,803 B2* | 7/2024 | Zhang | H04W 16/28 |
| 2011/0310845 A1 | 12/2011 | Jung et al. | |
| 2012/0122459 A1 | 5/2012 | Wu et al. | |
| 2013/0223205 A1 | 8/2013 | Chuang | |
| 2014/0228032 A1 | 8/2014 | Jung et al. | |
| 2015/0071250 A1 | 3/2015 | Dai et al. | |
| 2015/0079945 A1 | 3/2015 | Rubin et al. | |
| 2015/0312957 A1 | 10/2015 | Pelletier et al. | |
| 2016/0007261 A1 | 1/2016 | Oh et al. | |
| 2016/0174124 A1 | 6/2016 | Basu Mallick et al. | |
| 2016/0183233 A1* | 6/2016 | Park | H04W 36/0072 370/329 |
| 2016/0219475 A1 | 7/2016 | Kim | |
| 2016/0227505 A1 | 8/2016 | Loehr et al. | |
| 2016/0302129 A1 | 10/2016 | Löhr et al. | |
| 2016/0381699 A1 | 12/2016 | Rubin et al. | |
| 2017/0055187 A1 | 2/2017 | Kang et al. | |
| 2017/0164419 A1 | 6/2017 | Kim | |
| 2017/0230869 A1 | 8/2017 | Kubota et al. | |
| 2017/0257780 A1 | 9/2017 | Ryoo et al. | |
| 2017/0331577 A1 | 11/2017 | Parkvall et al. | |
| 2017/0331670 A1 | 11/2017 | Parkvall et al. | |
| 2018/0034515 A1 | 2/2018 | Guo et al. | |
| 2018/0035470 A1 | 2/2018 | Chen et al. | |
| 2018/0115990 A1 | 4/2018 | Abedini et al. | |
| 2018/0206171 A1 | 7/2018 | Basu Mallick et al. | |
| 2018/0288642 A1 | 10/2018 | Yilmaz et al. | |
| 2018/0359785 A1 | 12/2018 | Chen et al. | |
| 2019/0052317 A1 | 2/2019 | Yiu et al. | |
| 2019/0327629 A1* | 10/2019 | Zhang | H04B 7/0658 |
| 2020/0084674 A1 | 3/2020 | Kubota et al. | |
| 2022/0295329 A1* | 9/2022 | Zhang | H04B 7/0645 |

FOREIGN PATENT DOCUMENTS

| | | |
|---|---|---|
| CN | 105580427 A | 1/2020 |
| EP | 2249601 B1 | 12/2016 |
| EP | 2876932 B1 | 2/2019 |
| EP | 2888906 A1 | 3/2021 |
| JP | 2010263629 A | 11/2010 |
| JP | 2014531852 A | 11/2014 |
| JP | 2015527026 A | 9/2015 |
| KR | 20130034827 A | 4/2013 |
| KR | 20150095503 A | 8/2015 |
| KR | 20160120250 A | 10/2016 |
| WO | 2014036150 A1 | 3/2014 |
| WO | 2014078676 A2 | 5/2014 |
| WO | 2015002466 A2 | 1/2015 |
| WO | 2015014831 A1 | 2/2015 |
| WO | 2015156575 A1 | 10/2015 |
| WO | 2016043502 A1 | 3/2016 |
| WO | 2017171952 A1 | 10/2017 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)", Technical Specification, 3GPP TS 36.331 V14.0.0 (Sep. 2016), 644 Pages.
"3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Technical Specification, 3GPP TS 36.300 V14.0.0 (Sep. 2016), 314 Pages.
Declaration of Zhi Ding, Ph.D., IPR 2022-00348.
Declaration of Zhi Dong, IPR 2021-00644.
Dismissal Prior to Institution of Trial, IPR 2021-00644.
Ericsson, "Inter-cell Handover in NR", 3GPP TSG-RAN WG2 Meeting f96, R2-168730, Nov. 14-18, 2016, 7 Pages, Reno, Nevada.
Patent Owner's Preliminary Response, IPR 2022-00348, Jun. 23, 2022, 36 Pages.
Petition for Inter Partes Review of U.S. Pat. No. 10,484,915 Pursuant to 35 U.S.C. §§ 311-319, 37 C.F.R. § 42, IPR 2021-00644.
Petition for Inter Partes Review of U.S. Pat. No. 10,484,915 Pursuant to 35 U.S.C. §§ 311-319, 37 C.F.R. § 42, IPR 2022-00348, Feb. 15, 2022, 91 Pages.
PTAB Decision Denying Institution of Inter Partes Review 35 U.S.C. § 314. IPR 2022-00348, Sep. 21, 2022, 7 Pages.

* cited by examiner

WIRELESS HANDOVER

RELATED APPLICATIONS

This application is a continuation of U.S. application Ser. No. 17/501,618, filed Oct. 14, 2021, now U.S. patent Ser. No. 11/856,466, which is a continuation of U.S. application Ser. No. 16/672,464, filed Nov. 3, 2019, now U.S. patent Ser. No. 11/178,587, which is a continuation of U.S. application Ser. No. 16/211,399, filed Dec. 6, 2018, now U.S. Pat. No. 10,484,915, which is a continuation of International Application No. PCT/162017/056880, filed Nov. 3, 2017, which claims the benefit of U.S. Application No. 62/417,714, filed Nov. 4, 2016, the disclosures of which are fully incorporated herein by reference.

TECHNICAL FIELD

Embodiments presented herein relate to wireless handover, and in particular to methods, network nodes, wireless devices, computer programs, or computer program products for wireless handover.

BACKGROUND

One of the design goals of the New Radio (NR) for 5G wireless communication is to support operation on high frequencies (e.g., 28 GHz), where massive beamforming is needed to maintain adequate radio coverage. This has an impact on a number of system functions, including mobility procedures such as handover (HO). The HO procedure used in legacy long term evolution (LTE) (e.g., 4G wireless communication) is depicted in FIG. 1.

In legacy wireless communication systems, the user equipment (UE) has been configured with event based report triggering criteria. Once a triggering criterion has been met, the UE sends a measurement report to the source eNB (the eNB to which the UE is currently connected) via radio resource control (RRC). The measurement reporting parameters provided by the network aim to minimize both pi ng-pong as well as handover failures. For intra-frequency mobility this is typically achieved by configuring an A3 measurement event so that a report is triggered when a neighbour cell is found to be a few dB better than the serving cell. Due to measurement errors in bad radio conditions and due to the necessary filtering, the actual difference in signal strength may be worse than anticipated by the configured event threshold. A consequence of this is that many measurement reports and the subsequent mobility related RRC signalling are exchanged in challenging radio conditions and are hence error prone.

The mechanisms designed in LTE for mobility do not provide sufficient mechanisms for mobility in beam based systems. In particular, in a beam-based system like NR, and especially in higher frequency bands, the serving radio link to the UE may become impaired much more rapidly than in conventional LTE deployments. As the UE is moving out of the current serving beam coverage area, it may not be possible to conduct RRC signalling via the serving node to complete the HO procedure.

SUMMARY

An object of embodiments herein is to provide mobility mechanisms, such as handover, that support beam based systems. According to certain embodiments, a method performed by a wireless device for handover includes receiving a first handover message from a source network node associated with a source cell. The first handover message includes an identification of a target cell and access information associated with the target cell. The target cell is different than the source cell and comprises one or more beams. The access information includes beam related information. The method also includes identifying at least one beam from among the one or more beams of the target cell based on the identification of the target cell and the access information from the first handover message. The method additionally includes accessing the target cell using the identified at least one beam.

In some embodiments, the target cell is associated with a second network node that is different than the source network node. In certain embodiments, the access information comprises Random Access Channel (RACH) information. In particular embodiments the target cell has at least two beams. In such embodiments, the access information may comprise an indication of allowed beams associated with the target cell. The allowed beams may be fewer than all of the beams of the target cell. In some embodiments, the access information may include a random access preamble that is mapped to each of the allowed beams of the target cell. In certain embodiments, the access information includes common random access configuration information and dedicated random access resources for the allowed beams. In certain embodiments, accessing the target cell using the identified at least one beam may comprise accessing the target cell using a contention based random access procedure. In particular embodiments, accessing the target cell using the identified at least one beam may comprise accessing the target cell without first reading system information associated with the target cell.

According to certain embodiments, a wireless device for handover includes a wireless interface configured to receive a first handover message from a source network node. The source network node is associated with a source cell. The first handover message includes an identification of a target cell and access information associated with the target cell. The target cell is different than the source cell and comprises one or more beams. The wireless device also includes processing circuitry configured to identify at least one beam from among the one or more beams of the target cell based on the identification of the target cell and the access information from the first handover message. The wireless device also includes an input and output interface that is configured to receive input information and provide output information. The wireless device further includes a power source that is configured to provide power to the wireless interface, processing circuitry and input and output interface. The wireless interface is further configured to access the target cell using the identified at least one beam.

In accordance with certain embodiments, a wireless communication system for handover includes at least two network nodes. The wireless communication system also includes at least one wireless device wirelessly connected to a first of the at least two network nodes. The first network node is configured to determine access information associated with a second of the at least two network nodes for the at least one wireless device. The first network node is also configured to prepare the access information associated with the second network node to be transmitted to the at least one wireless device. The at least one wireless device is configured to receive a handover message from the first network node. The handover message comprising an identification associated with the second network node and the access information associated with the second network node. The at least one wireless device is also configured to identify and select at least one beam from the second network node. The at least one wireless device is further configured to access the second network node using the identified and selected at least one beam based on the access information from the handover message.

In accordance with certain embodiments, a wireless device for handover comprises a processor and computer readable storage media. The storage media contains instructions that are executable by the processor. When the instructions are executed, the wireless device is operative to receive a first handover message from a source network node associated with a source cell. The first handover message comprises an identification of a target cell and access information associated with the target cell. The target cell is different than the source cell and comprises one or more beams. The wireless device is also operative to identify at least one beam from among the one or more beams of the target cell based on the identification of the target cell and the access information from the first handover message. The wireless device is additionally operative to access the target cell using the identified at least one beam.

In accordance with some embodiments, a wireless device for handover comprises a receiver unit configured to receive a first handover message from a source network node associated with a source cell. The first handover message comprises an identification of a target cell and access information associated with the target cell. The target cell is different than the source cell and comprises one or more beams. The wireless device also comprises an identification unit configured to identify at least one beam from among the one or more beams of the target cell based on the identification of the target cell and the access information from the first handover message. The wireless device further includes an access unit configured to access the target cell using the identified at least one beam.

Advantageously one or more embodiments provide additional information in the contents of the handover command related to target beams in neighbouring cells. Additionally, one or more embodiments provide an extension of the synchronization and random access procedure to allow for the selection of a beam in the target cell. Certain embodiments further provide the ability to associate the handover command with a condition (e.g., RRCConnectionReconfiguration with mobilityControlInfo). As soon as the UE determines the condition to be fulfilled, it executes the handover in accordance with the handover command.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

It is to be noted that any feature of any of the above embodiments may be applied to any other embodiment, wherever appropriate. Likewise, any advantage of any of the embodiments herein may apply to the other embodiments, and vice versa. Other objectives, features and advantages of the enclosed embodiments will be apparent from the following detailed disclosure, attached claims, and drawings.

BRIEF DESCRIPTION OF THE DRAWINGS

Particular embodiments are now described, by way of example, with reference to the accompanying drawings, in which.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example so that this disclosure will assist in conveying the inventive concept to those skilled in the art. Like numbers refer to like elements throughout the description.

Figure 2:
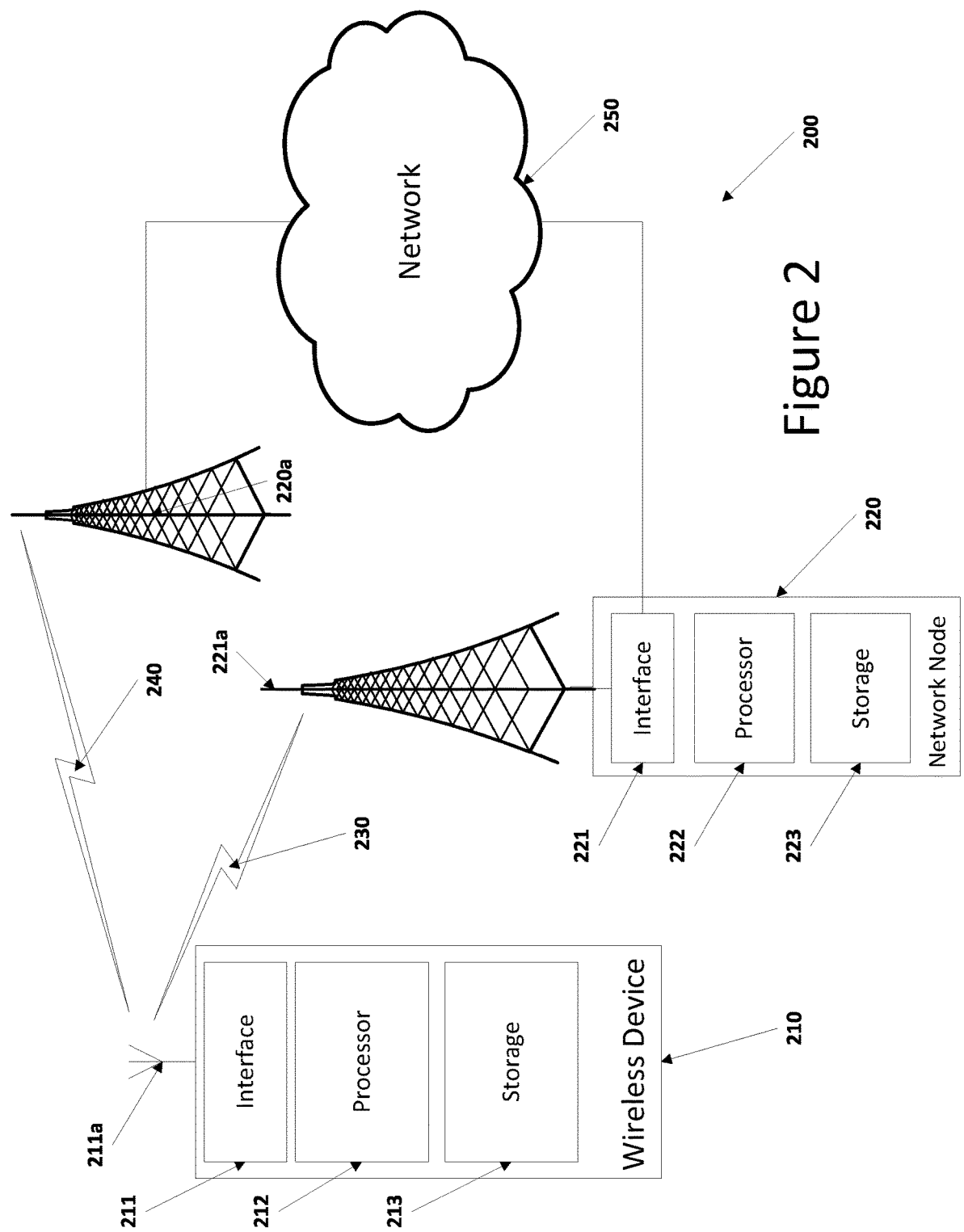
FIG. 2 illustrates a block diagram of a wireless network in accordance with particular embodiments.

Although the embodiments described herein may be implemented in any appropriate type of system using any suitable components, particular embodiments described herein may be implemented in a wireless network such as the example wireless communication network illustrated in FIG. 2. In the example embodiment illustrated in FIG. 2, the wireless communication network provides communication and other types of services to one or more wireless devices. In the illustrated embodiment, the wireless communication network includes network nodes 220 and 220a that facilitate wireless device 210's access to and/or use of the services provided by and through the wireless communication network. The wireless communication network may further include any additional elements suitable to support communication between wireless devices or between a wireless device and another communication device, such as a landline telephone.

Network 250 may comprise one or more backbone networks, IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 2 illustrates a wireless network comprising a more detailed view of network node 220 and wireless device (WD) 210, in accordance with a particular embodiment. For simplicity, FIG. 2 only depicts network 250, network nodes 220 and 220a, and WD 210. The detailed view of network node 220 comprises the hardware components of interface 221, antenna 221a (may be referred to collectively as an interface or a wireless interface), processor 222, and storage 223. Similarly, the detailed view of WD 210 comprises the hardware components of interface 211 and antenna 211a (may be referred to collectively as interface or wireless interface) processor 212, and storage 213. These components may work together in order to provide network node and/or wireless device functionality, such as providing wireless connections in a wireless network and/or facilitating in the handover of wireless connections in a beam based network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

A network node may refer to equipment capable, configured, arranged and/or operable to communicate directly or indirectly with a wireless device and/or with other equipment in the wireless communication network that enable and/or provide wireless access to the wireless device or which provide some service to a wireless device that has accessed the wireless communication network. Examples of network nodes include, but are not limited to, access points (APs), in particular radio access points, and base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). As a particular non-limiting example, a base station may be a relay node or a relay donor node controlling a relay node.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs.

In FIG. 2, the components of network node 220 are depicted as single boxes located within a single larger box. In practice however, a network node may comprise multiple different physical components that make up a single illustrated component (e.g., interface 221 may comprise terminals for coupling wires for a wired connection and a radio transceiver for a wireless connection). As another example, network node 220 may be a virtual network node in which multiple different physically separate components interact to provide the functionality of network node 220 (e.g., processor 222 may comprise three separate processors located in three separate enclosures, where each processor is responsible for a different function for a particular instance of network node 220). Similarly, network node 220 may be composed of multiple physically separate components (e.g., a NodeB component and a RNC component, a BTS component and a BSC component, etc.), which may each have their own respective processor, storage, and interface components. In certain scenarios in which network node 220 comprises multiple separate components (e.g., BTS and BSC components), one or more of the separate components may be shared among several network nodes. For example, a single RNC may control multiple NodeB's. In such a scenario, each unique NodeB and RNC pair may be considered a separate network node. In some embodiments, network node 220 may be configured to support multiple radio access technologies (RATs). In such embodiments, some components may be duplicated (e.g., separate storage 223 for the different RATs) and some components may be reused (e.g., the same antenna 221a may be shared by the RATs).

Processor 222 may be a combination of one or more of a microprocessor, controller, microcontroller, central processing unit, digital signal processor, application specific integrated circuit, field programmable gate array, or any other suitable computing device, resource, or combination of hardware and software and/or encoded logic operable to provide, either alone or in conjunction with other network node 220 components, such as storage 223, network node 220 functionality. For example, processor 222 may execute instructions stored in storage 223. Such functionality may include providing various wireless features discussed herein to a wireless device, such as WD 210, including any of the features or benefits disclosed herein.

Storage 223 may comprise any form of non-transitory volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 223 may store any suitable instructions, data or information, including software and/or encoded logic, utilized by network node 220. Storage 223 may be used to store any calculations made by processor 222 and/or any data received via interface 221.

Network node 220 also comprises interface 221 which may be used in the wired or wireless communication of signalling and/or data between network node 220, network 250, and/or WD 210. For example, interface 221 may perform any formatting, coding, or translating that may be needed to allow network node 220 to send and receive data from network 250 over a wired connection. Interface 221 may also include a radio transmitter and/or receiver that may be coupled to or a part of antenna 221a. The radio may receive digital data that is to be sent out to other network nodes or WDs via wireless connections. The radio may convert the digital data into a radio signal having the appropriate channel and bandwidth parameters. The radio signal may then be transmitted via antenna 221a to the appropriate recipient (e.g., WD 210). The radio signal may comprise one or more beams.

Antenna 221a may be any type of antenna capable of transmitting and receiving data and/or signals wirelessly. In some embodiments, antenna 221a may comprise one or more omni-directional, sector or panel antennas operable to transmit/receive radio signals between, for example, 1 GHz and 100 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

A wireless device (WD) may refer to a device capable, configured, arranged and/or operable to communicate wirelessly with network nodes and/or other wireless devices. Communicating wirelessly may involve transmitting and/or receiving wireless signals using electromagnetic signals, radio waves, infrared signals, and/or other types of signals suitable for conveying information through air. In particular embodiments, a wireless device may be configured to transmit and/or receive information without direct human interaction. For instance, a wireless device may be designed to transmit information to a network on a predetermined schedule, when triggered by an internal or external event, or in response to requests from the network. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE). In some embodiments, a wireless device may support device-to-device (D2D) communication, for example by implementing a 3GPP standard for sidelink communication, and may in this case be referred to as a D2D communication device.

As one specific example, a wireless device may represent a UE configured for communication in accordance with one or more communication standards promulgated by the 3 rd Generation Partnership Project (3GPP), such as 3GPP's GSM, UMTS, LTE, and/or 5G standards. A UE may not necessarily have a "user" in the sense of a human user who owns and/or operates the relevant device. Instead, a UE may represent a device that is intended for sale to, or operation by, a human user but that may not initially be associated with a specific human user, such as smart sensors or smart meters. The features, functionality, steps, and benefits described with respect to a WD may be equally applicable to a UE and vice versa.

As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 2, WD 210 may be any type of wireless device described above including a wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network nodes 220 or 220a and/or other WDs. Like network node 220, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity). Additionally, in some embodiments, some components may be remote from WD 210 (e.g., storage 213 may comprise some local storage and some cloud based storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware and, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 220. For example, interface 211 may perform any formatting, coding, or translating that may be needed to allow WD 210 to send and receive data from network node 220 over a wireless connection. Interface 211 may also include a radio transmitter and/or receiver that may be coupled to or a part of antenna 211a. The radio may receive digital data that is to be sent out to network node 220 via a wireless connection. The radio may convert the digital data into a radio signal having the appropriate channel and bandwidth parameters. The radio signal may then be transmitted via antenna 211a to network node 220.

Antenna 211a may be any type of antenna capable of transmitting and receiving data and/or signals wirelessly. In some embodiments, antenna 211a may comprise one or more omni-directional, sector or panel antennas operable to transmit/receive radio signals between 1 GHz and 100 GHz. For simplicity, antenna 211a may be considered a part of interface 211 to the extent that a wireless signal is being used.

Figure 3:
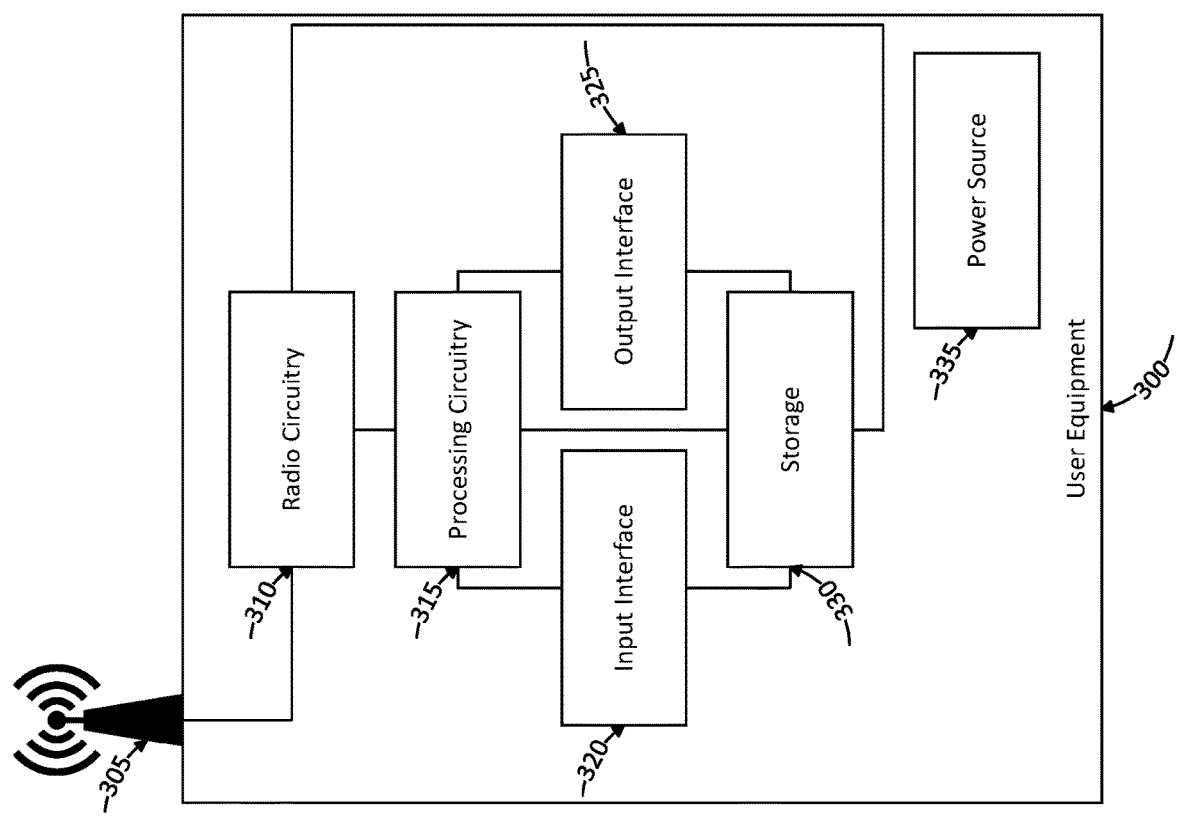
FIG. 3 illustrates a block diagram of a user equipment in accordance with particular embodiments.

FIG. 3 illustrate a block diagram of a UE. As shown in FIG. 3, UE 300 is an example wireless device. UE 300 includes an antenna 305, radio front-end circuitry 310, processing circuitry 315, input interface 320, output interface 325, a computer-readable storage 330, and power source 335. Antenna 305 may include one or more antennas or antenna arrays, and is configured to send and/or receive wireless signals, and is connected to radio front-end circuitry 310. In certain alternative embodiments, UE 300 may not include antenna 305, and antenna 305 may instead be separate from UE 300 and be connectable to UE 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain alternative embodiments, UE 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chips or sets of chips. In alternative embodiments, part or all of the baseband processing circuitry and application processing circuitry may be combined into one chip or set of chips, and the RF transceiver circuitry may be on a separate chips or sets of chips. In still alternative embodiments, part or all of the RF transceiver circuitry and baseband processing circuitry may be on the same chip or set of chips, and the application processing circuitry may be on a separate chip or set of chips. In yet other alternative embodiments, part or all of the RF transceiver circuitry, baseband processing circuitry, and application processing circuitry may be combined in the same chip or set of chips. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device or UE may be provided by processing circuitry 315 executing instructions stored on a computer-readable storage medium 330. In alternative embodiments, some or all of the functionality may be provided by processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device or UE. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting or receiving operations described herein as being performed by a wireless device. Any information, data and/or signals may be transmitted or received to a network node and/or another wireless device or UE. These components may be referred to collectively as an interface when used it the transmitting or receiving of data and/or signals.

Computer-readable storage medium 330 is generally operable to store instructions, such as a computer program, software, an application including one or more of logic, rules, code, tables, etc. and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Shown in FIG. 3, but not in FIG. 2, are input interface 320 and output interface 325. These may be configured to receive input information and provide output information. For example, a user associated with WD 210 may use input interface 320 to select audio or video content to be streamed to WD 210 for playback on output interface 325. The streamed content may be streamed to WD 210 as WD 210 moves between geographic areas associated with the source cell to the target cell.

As illustrated, UE 300 includes input interface 320. Input interface 320, may comprise any devices and circuits configured to allow input of information into UE 300, and are connected to processing circuitry 315 to allow processing circuitry 315 to process the input information. For example, input interface 320 may include a microphone, a proximity or other sensor, keys/buttons, a touch display, one or more cameras, a USB port, or other input elements.

Output interface 325 may comprise any devices and circuits configured to allow output of information from UE 300, and are connected to processing circuitry 315 to allow processing circuitry 315 to output information from UE 300. For example, output interface 315 may include a speaker, a display, vibrating circuitry, a USB port, a headphone interface, or other output elements. Using one or more input interface 320 and output interface 325, UE 300 may communicate with end users and/or the wireless network, and allow them to benefit from the functionality described herein.

Shown in FIG. 3, but not in FIG. 2, WD 210 may also comprise power source 335. Power source 335 may be configured to provide power to the various components of WD 210, such as wireless interface 211, processing circuitry 212, storage 213, input interface 320, output interface 325 and any other components of WD 210 that rely on electrical power to operate.

As illustrated, UE 300 includes power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, Wi-Fi, or Bluetooth wireless technologies. These wireless technologies may be integrated into the same or different chips or sets of chips s and other components within wireless device 300.

Alternative embodiments of UE 300 may include additional components beyond those shown in FIG. 3 that may be responsible for providing certain aspects of the UE's functionality, including any of the functionality described herein and/or any functionality necessary to support the solution described herein.

The following description may help illustrate how the components of FIGS. 2 and 3 may work to provide the features and benefits of wireless handover of certain embodiments disclosed herein. For simplicity, the description below will focus on the components of FIG. 2, but is equally applicable with the corresponding components of FIG. 3. In the scenario described below, network node 220 may be referred to as a source network node because it is WD 210's current source for wireless access. Source network node 220 may be associated with one or more cells. Each cell is associated with, and provides wireless coverage for, a particular geographic area. The cell currently being used by WD 210 may be referred to as a source cell while the cell to which WD 210 is to be handed over may be referred to as a target cell. While it may be that both the source cell and the target cell are provided by the same network node, for purposes of simplicity herein it may be assumed that the source cell is associated with network node 220 and the target cell is associated with network node 220a. It may also be assumed that target network node 220a uses a plurality of beams in providing wireless coverage within the target cell.

Interface 211 may comprise a wireless interface suitable for sending and receiving data, messages, signaling and/or other information (collectively "data") over an air interface. In certain embodiments, wireless interface 211 may be configured to receive a first handover message from network node 220. In certain embodiments, the first handover message may include multiple pieces of information that can be used by WD 210 in the handover from the source cell to the target cell. For example, the handover message may include an identification of the target cell and access information associated with the target cell, such as information related to the beams provided by target network node 220a for the target cell. The beams provided may include all the beams associated with the target cell, or a subset thereof. The subset may be a predetermined subset (e.g., certain beams reserved for handover) or selected based on one or more conditions (e.g., current load of the beams associated with the target cell). In some embodiments, the access information may be Random Access Channel (RACH) information associated with the target cell. In some embodiments, the access information may include a random access preamble mapped to each of the allowed beams of the target cell. In some embodiments, the access information may include common random access configuration information and dedicated random access resources for the allowed beams. The allowed beams may be those beams which WD 210 will be allowed to use to access the target cell. The allowed beams may be a subset of the beams associated with the target cell or the available beams associated with the target cell.

The handover message may be determined and transmitted by source network node 220. More specifically, interface 221 of source network node 220 may receive certain information from target network node 220a (e.g., available beams, allowed beams, configuration/synchronization information for the beams, etc.). Processing circuitry 222 may then use the information along with information from WD 210 to determine the access information that is to be included in the handover message provided to WD 210.

Processing circuitry 212 of wireless device 210 may be used to identify at least one beam from among the one or more beams of the target cell. If only one beam is provided, then that may be the identified beam, if more than one beam is provide, processor 212 may determine the beam best suited for WD 210. The beam(s) may be identified based on the identification of the target cell and the access information from the first handover message. In some embodiments and/or scenarios, the beam(s) may be identified based on measurements made of the beams provided by the target network node. The measurements may be made on any/all beams received by interface 211 or on certain specified beams. The beams may be specified in any of a variety of different ways such as in a message provided to WD 210, preconfigured and stored in storage 213, or otherwise provided to WD 210. In some embodiments the specified beams may be fewer than all of the beams of the target cell or fewer than all of the beams detectable by WD 210. In some embodiments, WD 210 may measure one or more characteristics of the beams of the target cell and then send a report to source network node 220 via interface 211. The information from the report may be used in identifying the beams.

Once processing circuitry 212 has selected the appropriate beam, and any other handover pre-requisites have been satisfied, wireless interface 211 may be configured to access the target cell using the identified at least one beam. In some embodiments wireless interface 211 may access the target cell using a contention based random access procedure. This access may be based on information received in the handover message. In some embodiments, wireless interface 211 may access the target cell without having to first read system information associated with the target cell (e.g., random access parameters or RACH). That is, source node 220 may include sufficient details in the access information to allow WD 210 to access the target cell without needing that information from target node 220a.

Figure 1:
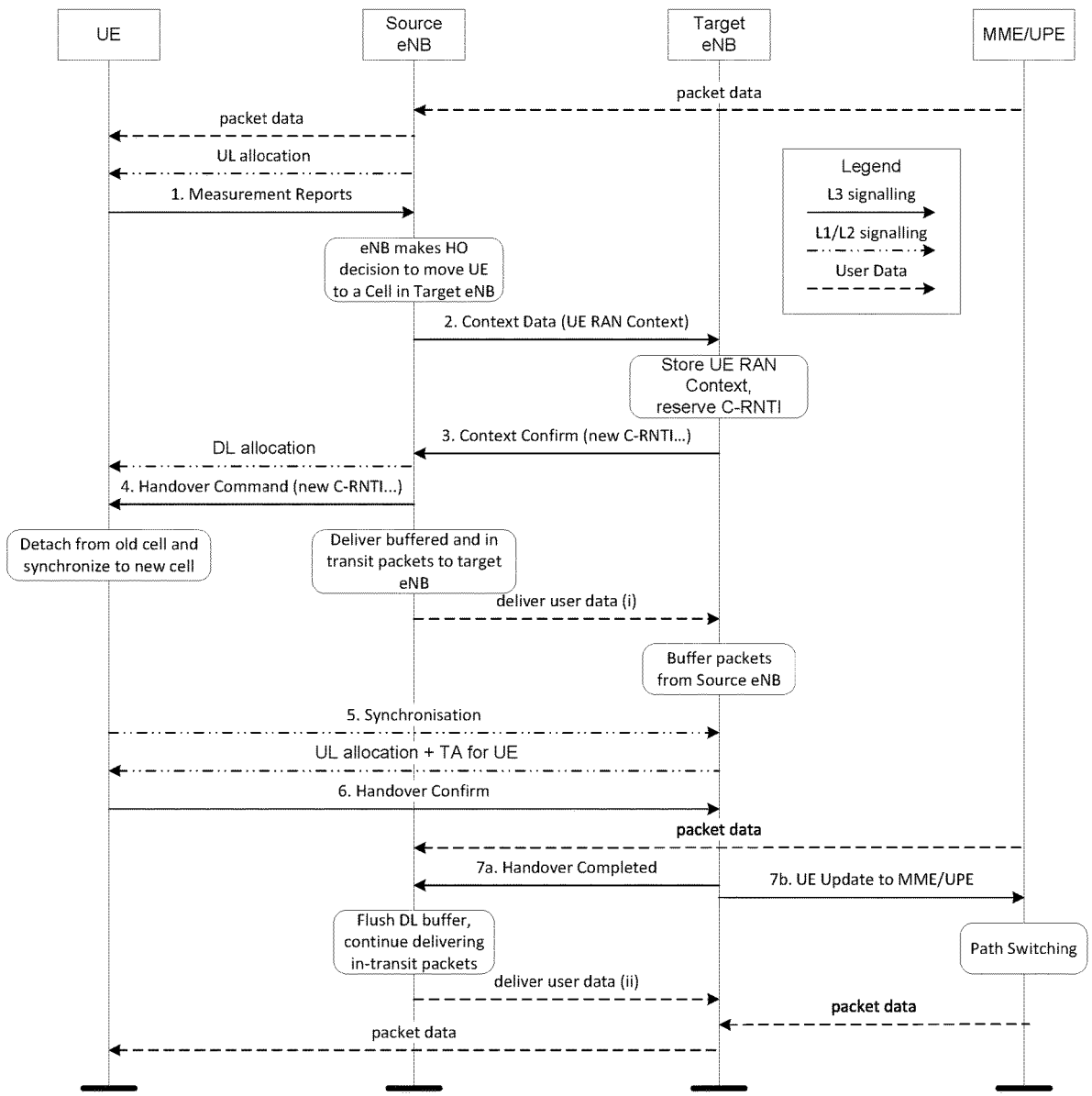
FIG. 1 illustrates a signalling diagram for active mode mobility in legacy LTE wireless communication systems.
Figure 4:
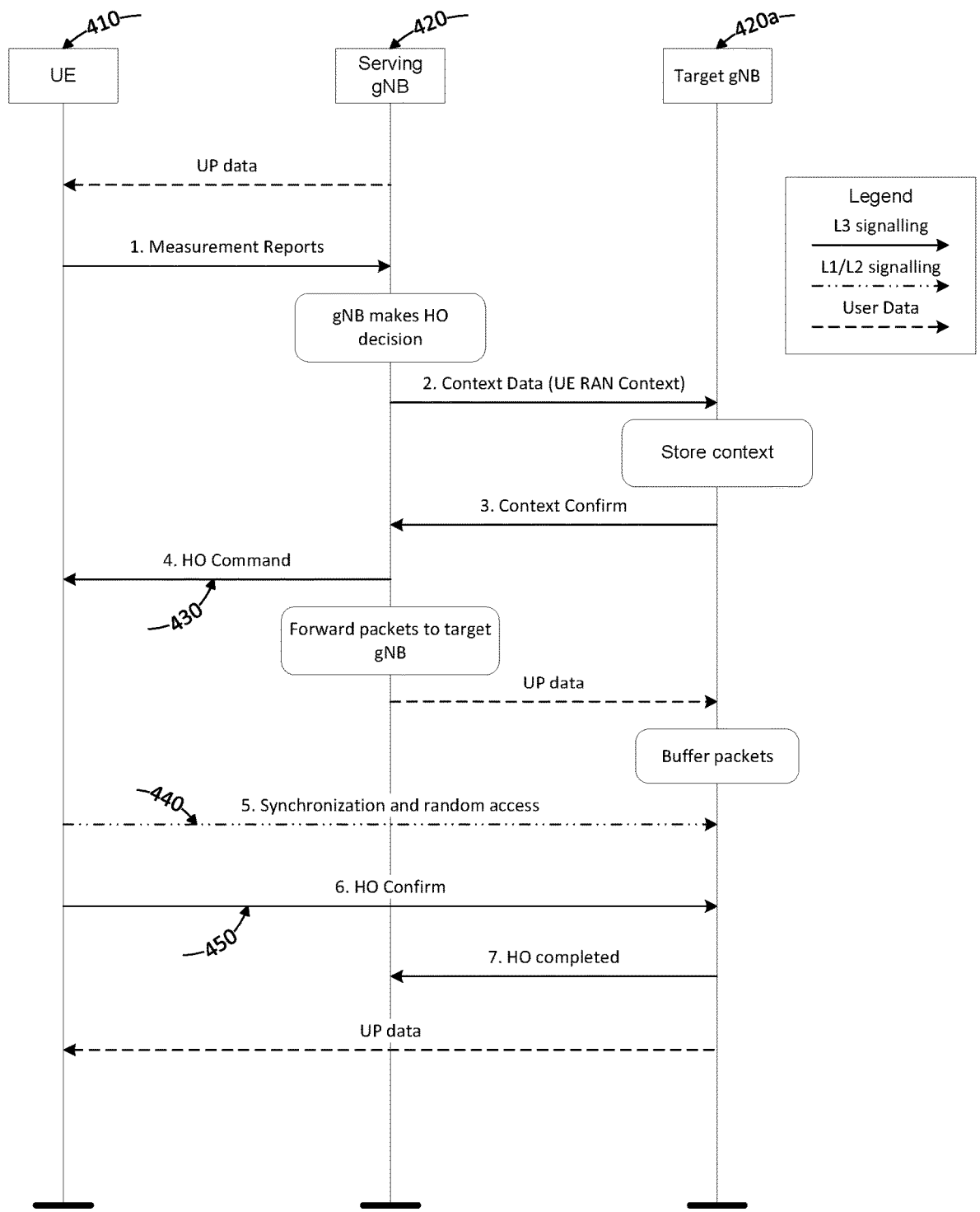
FIG. 4 illustrates a signalling diagram of a handover in accordance with particular embodiments.

The components described above with respect to FIGS. 2 and 3 may be used to modify the legacy mobility procedure (illustrated in FIG. 1). FIG. 4 illustrates a signalling diagram of the handover procedure in accordance with particular embodiments. The order of the signals is similar to the legacy procedure however the information and how it is determined and used is different. Depending on the embodiment, these differences can be discussed based on the information contained in handover command 430 and the corresponding synchronization and random access procedure 440. The devices illustrated in FIG. 4 may, in some embodiments, comprise similar components and provide similar functionality as described above wherein UE 410 may correspond to WD 210, serving gNB 420 may correspond to network node 220 and target gNB 420a may correspond to network node 220a.

In some embodiments, with respect to providing UE 410 with an identity of target gNB 420a, HO command 430 may include only the cell identity associated with target gNB 420a. The cell identity can be signalled either explicitly or implicitly via, for example, mobility reference signal (MRS) configuration. HO command 430 may comprise RRCConnectionReconfiguration and mobilityControlInfo. Once the cell identity is received by an interface of UE 410 and processed, a processor therein may select any beam with the correct cell identity detected by the interface of UE 410. UE 410 then reads the random access parameters from system information and uses those for the initial synchronization and random access 440 on the selected beam. In some embodiments, the random access may be a contention based random access procedure. These embodiments have the benefit of requiring a relatively small amount of signalling and network configuration in HO command 430 but may result in a handover failure if there are other users competing for the random access at the same time.

In some embodiments, in addition to the cell identity of target gNB 420a, HO command 430 may further include physical random access channel (PRACH) configuration information for the target cell. This information may be explicitly signalled in HO command 430, or it may be derived from other parameters, such as via configuration of mobility reference signals. Depending on the scenario and/or embodiment, multiple PRACH configurations may be provided to enable different random access (RA) parameters for different beams or beam groups. An interface of UE 410 may receive HO command 430 and a processor of UE 410 may then autonomously select a beam associated with the correct cell identity. UE 410 then uses the provided PRACH parameters from HO command 430 for the initial synchronization and random access 440 on the selected beam. This has the benefit of allowing the network to provide a dedicated handover configuration for UE 410, but requires some additional configuration and signalling as part of HO command 430.

In some embodiments, in addition to the cell identity and PRACH configuration information of target gNB 420a, HO command 430 may further include a list of allowed beams from target gNB 420a. The list of allowed beams may comprise a list of beam IDs. The list of beam IDs may be fewer than all the beams associated with target gNB 420a. This target cell information (including the list of beams) may be explicitly signalled, or may be derived from other parameters, such as configuration of mobility reference signals. Depending on the scenario and/or embodiment multiple PRACH configurations may be provided to enable different RA parameters for different beams or beam groups. HO command 430 is received by an interface of UE 410 and then a processor of UE 410 may autonomously select a beam from the list of allowed beams associated with the correct cell identity. UE 410 may then use the random access parameters from HO command 430 and uses those for the initial synchronization and random access 440 on the selected beam. This has the benefit of allowing the network to provide a dedicated handover configuration for UE 410, and limiting the number of possible beams UE 410 may select from, but requires again additional configuration and signalling. Additionally, in some scenarios, UE 410 may end up in a non-optimal beam if the optimal beam is not on the list of allowed beams provided in HO command 430.

In some embodiments, in addition to the cell identity and PRACH configuration information of target gNB 420a, HO command 430 may include an indication of a single allowed beam. This target cell information may be explicitly signalled, or may be derived from other parameters, such as configuration of mobility reference signals. An interface of UE 410 may receive HO command 430. Because there is only the one allowed beam, a processor of UE 410 does not need to make a selection of a beam, rather the processor of UE 410 synchronizes to the provided beam with the correct cell identity based on the beam ID provided in HO command 430. UE 410 then uses the random access parameters from HO command 430 for the initial synchronization and random access 440. This has the benefit of allowing the network to provide a dedicated handover configuration for UE 410 and explicitly assigning the user to a particular beam, but it requires additional configuration and signalling and may be more likely to result in the UE ending up in a non-optimal beam.

In some embodiments, in addition to the cell identity, PRACH configuration information, and list of allowed beams, HO command 430 may also comprise a mapping between the allowed beams and a RA preamble (or some other part of access configuration). This information may be explicitly signalled, or may be derived from other parameters, such as configuration of MRS. An interface of UE 410 may receive HO command 430 and then a processor of UE 410 may autonomously select a beam with the correct cell identity from the list of allowed beam IDs and set the random access preamble value to the value corresponding to the selected beam identifier. UE 410 may then use the PRACH configuration information and RA preamble corresponding to the selected beam in the initial synchronization and random access 440. This has the benefit of allowing the network to provide a dedicated handover configuration for UE 410, limiting the number of possible beams UE 410 may select from, and allowing the network to immediately detect which beam the UE has selected, but requires again additional configuration and signalling and may result in UE 410 using a non-optimal beam.

Figure 5:
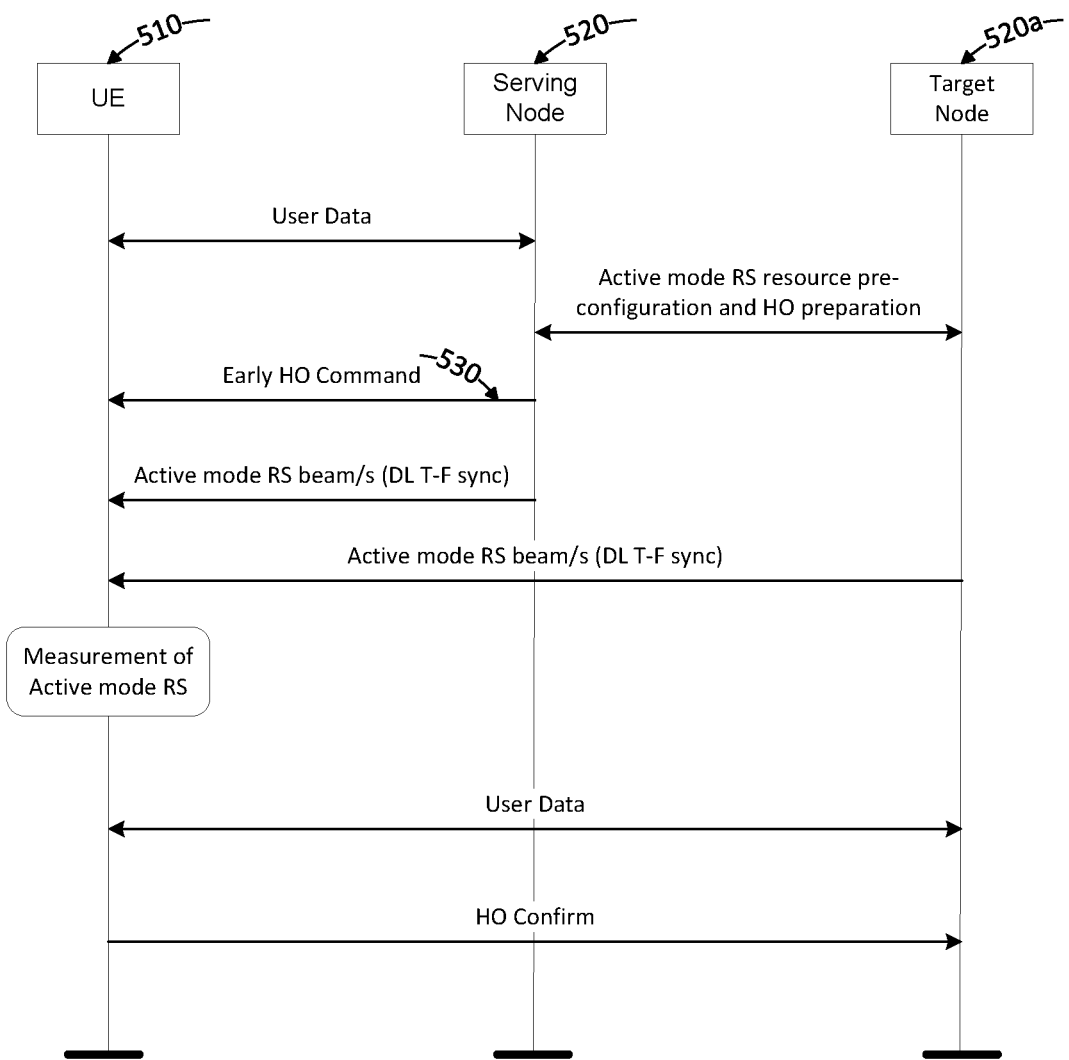
FIG. 5 illustrates a signalling diagram of a conditional handover execution based on downlink received signal measurements, in accordance with particular embodiments.

FIG. 5 illustrates a signalling diagram of a conditional handover execution based on downlink received signal measurements, in accordance with particular embodiments. In some scenarios involving legacy systems, the probability of hand over failure could increase due to the dependency on the RRC signalling transmissions from the source cell at a time when the UE has already moved into the coverage area of the target cell. To avoid the undesired dependence on the serving radio link at the time (and radio conditions) where the UE should execute the handover, certain embodiments may provide the RRC signalling 530 to UE 510 earlier. For example, the RRC signalling 530 may be sent prior to the occurrence of a triggering event which would trigger sending RRC signalling in legacy systems. This may be done, for example, by associating the handover with a condition; when the condition is fulfilled, UE 510 may execute the handover in accordance with the information provided in HO command 530.

One such condition which might trigger handover could be that the reference signal of the target cell or beam becomes "x" dB stronger than the reference signal of the serving cell or beam. The threshold used in a preceding measurement reporting event could then be chosen lower than the one in the handover execution condition. This may allow the serving cell to prepare the handover upon reception of an early measurement report and to provide the RRCConnectionReconfiguration with mobilityControlInfo at a time when the radio link between the source network node and the UE is still stable. The execution of the handover is done at a later point in time (and threshold) that is considered optimal for the handover execution.

Although FIG. 5 depicts an example with just serving node 520 and a single target node 520a. In practice there may often be many cells or beams from many nodes that UE 510 may have reported as possible candidates based on its preceding RRM measurements. The RAN may then have the freedom to issue conditional handover instructions for several candidate network nodes. The RRCConnectionReconfiguration for each of those candidates may differ. For example, in terms of the HO execution condition (RS to measure and threshold to exceed) as well as in terms of the RA preamble (denoted Uplink Signature Signal) to be sent when a condition is met. It may for example increase the HO success rate if the UE indicates by means of different RA preambles, which of the candidate target beams it selected (e.g., which beam fulfilled the HO execution condition).

In some embodiments, the RRCConnectionReconfiguration for the early HO command could for example, also comprise a configuration for sending UL reference signals (similar to RA preambles) that both the serving as well as the neighbour nodes attempt to receive. The network could determine the most suitable cell based on the observed uplink signals and issue a downlink reference signal upon which the UE executes the pre-conditioned HO command. A UE aiming to support URLLC with extremely short HO interruption could be configured to maintain the data exchange with the source node while establishing the data exchange with the target node. As noted in a prior study, this may require additional hardware elements in the UE and may therefore not be supported by all UEs.

Figure 6:
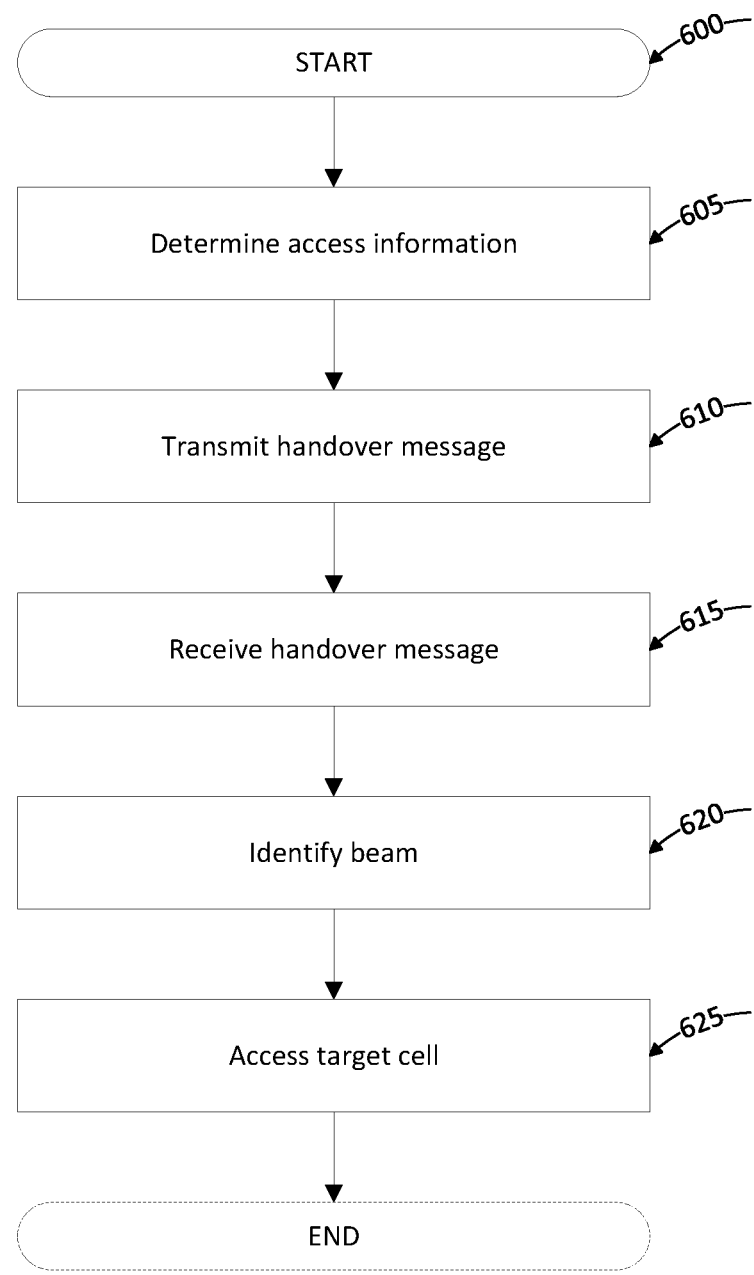
FIG. 6 illustrates a flowchart of a method for wireless handover, in accordance with particular embodiments.

FIG. 6 illustrates a flowchart of a method for wireless handover, in accordance with particular embodiments. The method begins at step 600. Each step will include an indication of the device performing the step in the embodiment illustrated in FIG. 6. The indicated device is provided for ease of explanation, it is not necessarily required that the specified device perform the indicated step. In other embodiments, different devices may be used to perform one or more of the steps. The devices mentioned in FIG. 6 include a wireless device, a source network node and a target network node. The source network node is the network node providing wireless service to the wireless device at the start of the method. This service is provided in a source cell. The target network node is the network node to which the wireless device is to be handed over. The target network node provides wireless service in a target cell. In some scenarios, the source cell and the target cell may be provided by the same physical network node (e.g., a MSR network node).

At step 605 the source network node determines the relevant access information for the target cell. The target cell is different than the source cell and includes one or more beams. The access information may be determined based on information provided by the target network node. In some embodiments, the access information may be specific to a particular UE or it may be generic such that it is applicable to any UE (or it may be general information that can be used create UE specific access information). In particular embodiments, the access information may comprise an indication of allowed beams. In some embodiments, the access information includes a random access preamble mapped to each of the allowed beams of the target cell. In certain embodiments, the access information includes common random access configuration information and dedicated random access resources for the allowed beams.

At step 610 the source network node transmits a handover message that includes information that can be used by the wireless device to access the target cell. For example, the handover message may include an identification of the target cell. As another example, the handover message may also include access information comprising beam related information associated with the target cell. In some embodiments, the access information may comprise Random Access Channel (RACH) information. In some embodiments, the beam related information may relate to fewer than all of the available beams of the target cell.

At step 615 the wireless device receives the handover message from the source network node. In some embodiments, the handover message may received in response to a triggering event (e.g., source signal quality falls below threshold, target signal quality exceeds threshold, etc.). This timing may be similar to legacy timing in terms of when the handover message is sent. In some embodiments, the handover message may received prior to the triggering event occurring. This may allow the source network node to provide the wireless device with the access information for the target cell at a time when the signal quality between the source network node and the wireless device is better (as compared to waiting for the triggering event to occur).

At step 620 the wireless device identifies at least one beam from the target cell based on the information in the handover message (e.g., the identification of the target cell and the access information associated with the target cell). In some embodiments, the wireless device may identify a beam based on one or more quality characteristics of the available/allowed beams associated with the target cell. In some scenarios, only one beam may have been provided, in which the wireless device simply selects the provided beam.

At step 625 the wireless device accesses the target cell using the identified at least one beam. The target cell may be accessed based on the access information received in the handover message received at step 615. The target cell may be accessed without the wireless device having to first read system information associated with the target cell. In some embodiments, accessing the target cell using the identified at least one beam may comprise accessing the target cell using a contention based random access procedure.

The steps described above are merely illustrative of certain embodiments. It is not required that all embodiments incorporate all the steps above nor that the steps be performed in the exact order depicted in FIG. 6. Furthermore, some embodiments may include steps not illustrated in FIG. 6. For example, in some embodiments, the wireless device may provide the source network node with an indication of a signal quality associated with one or more beams from the target node.

Figure 7:
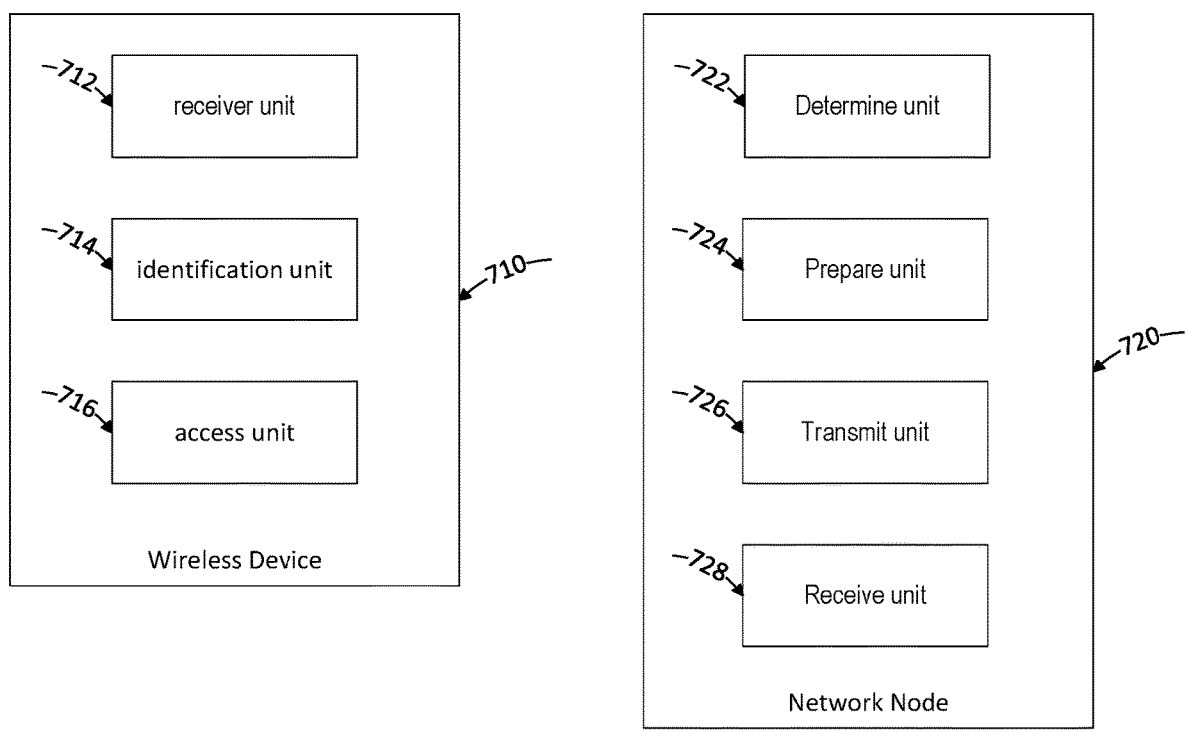
FIG. 7 illustrates a block diagram of the functional units of a wireless device and a network node, in accordance with particular embodiments.

FIG. 7 illustrates a block diagram of the functional units of a wireless device and a network node in accordance with particular embodiments. In particular, there is depicted the functional units of a particular wireless device 710 and network node 720. Other embodiments may include more, fewer, or different functional units. Moreover, a single depicted unit may represent multiple similar units. For example, determine unit 722 may represent multiple determine units configured to make different determinations. The units may comprise software, computer programs, subroutines, libraries, source code, or any other form of executable instructions that are run by, for example, a processor. In this FIG. 7, wireless device 710 comprises receiver unit 712, identification unit 714, and access unit 716; and network node 720 comprises determine unit 722, prepare unit 724, transmit unit 726, and receive unit 728.

Starting with the components of WD 710, receiver unit 712 is configured to receive a first handover message from a source network node associated with a source cell. The first handover message comprises an identification of a target cell and access information associated with the target cell. In some embodiments there may be more than 2 potential target cells. The target cell is different than the source cell and comprises one or more beams. In some embodiments, the target cell is associated with a second network node that is different than the source network node. In some embodiments, the access information comprises Random Access Channel (RACH) information. In certain embodiments, the target cell has at least two beams and the access information comprises an indication of allowed beams associated with the target cell. In such embodiments, the allowed beams may be fewer than all of the beams of the target cell. In particular embodiments, the access information includes a random access preamble mapped to each of the allowed beams of the target cell. In some embodiments, the access information includes common random access configuration information and dedicated random access resources for the allowed beams.

Identification unit 714 is configured to identify at least one beam from among the one or more beams of the target cell based on the identification of the target cell and the access information from the first handover message.

Access unit 716 is configured to access the target cell using the identified at least one beam. In some embodiments, access unit 716 is further configured to access the target cell using a contention based random access procedure. In certain embodiments, access unit 716 is further configured to access the target cell without first reading system information associated with the target cell.

Now looking at network node 720, determine unit 722 is configured to determine access information associated with a second network node for the at least one wireless device. The access information may be determined from information received from the target cell. In some embodiments, the information from the target cell may be combined with information stored by network node 720 to determine the access information associated with the second network node.

Prepare unit 724 is configured to prepare the access information associated with the second network node to be transmitted to a wireless device, such as wireless device 710.

Transmit unit 726 is configured to transmit the access information to the wireless device.

Receive unit 728 is configured to receive access information from the other network node. The received access information is to be sent to the wireless device with or without modification to the access information made by network node 720 (e.g., network node may simply forward access information provided by the target cell or it may modify the information provided by the target cell).

Any appropriate steps, methods, or functions may be performed through a computer program product that may, for example, be executed by the components and equipment illustrated in one or more of the figures above. For example, storage 223 may comprise computer readable means on which a computer program can be stored. The computer program may include instructions which cause processor 222 (and any operatively coupled entities and devices, such as interface 221 and storage 223) to execute methods according to embodiments described herein. The computer program and/or computer program product may thus provide means for performing any steps herein disclosed.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method performed by a wireless device for handover, the method comprising:
   receiving an RRC connection reconfiguration message from a source gNB, the RRC connection reconfiguration message comprising configuration information for a plurality of beams, the configuration information comprising common random access configuration information associated with one or more beams of a target cell and dedicated random access configuration information associated with one or more beams of the target cell, wherein the target cell is different than a source cell, the source cell is associated with the source gNB;
   selecting a beam associated with the target cell based on the configuration information for the plurality of beams, the selected beam to be used in a handover to the target cell;
   accessing the target cell using the selected beam; and
   transmitting a confirmation message to the target network node indicating that the handover has been completed.

2. The method of claim 1, wherein the target cell is associated with a target gNB, the target gNB being different than the source gNB.

3. The method of claim 1, wherein the configuration information comprises Random Access Channel (RACH) information.

4. The method of claim 1, wherein the target cell uses at least two beams and the configuration information comprises an indication of one or more allowed beams associated with the target cell, the allowed beams comprising fewer than all of the beams of the target cell.

5. The method of claim 4, wherein the configuration information includes a random access preamble mapped to each of the allowed beams of the target cell.

6. The method of claim 1, wherein accessing the target cell using the selected beam comprises accessing the target cell using a contention based random access procedure.

7. The method of claim 1, wherein accessing the target cell using the selected beam comprises accessing the target cell using a contention free random access procedure.

8. The method of claim 1, wherein accessing the target cell using the selected beam comprises accessing the target cell without first reading system information associated with the target cell.

9. A wireless device for handover comprising:
   a wireless interface configured to receive an RRC connection reconfiguration message from a source gNB, the RRC connection reconfiguration message comprising configuration information for a plurality of beams, the configuration information comprising common random access configuration information associated with one or more beams of a target cell and dedicated random access configuration information associated with one or more beams of the target cell, wherein the target cell is different than a source cell, the source cell is associated with the source gNB; and processing circuitry configured to select a beam associated with the target cell based on the configuration information for the plurality of beams, the selected beam to be used in a handover to the target cell;

wherein the wireless interface and processing circuitry are further configured to:
  access the target cell using the selected beam; and
  transmit a confirmation message to the target network node indicating that the handover has been completed.

10. The wireless device of claim 9, wherein the target cell is associated with a target gNB, the target gNB being different than the source gNB.

11. The wireless device of claim 9, wherein the configuration information comprises Random Access Channel (RACH) information.

12. The wireless device of claim 9, wherein the target cell uses at least two beams and the configuration information comprises an indication of one or more allowed beams associated with the target cell, the allowed beams comprising fewer than all of the beams of the target cell.

13. The wireless device of claim 12, wherein the configuration information includes a random access preamble mapped to each of the allowed beams of the target cell.

14. The wireless device of claim 9, wherein the wireless interface and processing circuitry configured to access the target cell using the selected beam are further configured to access the target cell using a contention based random access procedure.

15. The wireless device of claim 9, wherein the wireless interface and processing circuitry configured to access the target cell using the selected beam are further configured to access the target cell using a contention free random access procedure.

16. The wireless device of claim 9, wherein the wireless interface and processing circuitry configured to access the target cell using the selected beam are further configured to access the target cell without first reading system information associated with the target cell.

17. A wireless communication system for handover, the system comprising:
  a first network node associated with a first cell;
  a second network node associated with a second cell; and
  at least one wireless device wirelessly connected to a first of the at least two network nodes;
  wherein the first network node is configured to:
    obtain access information associated with the second cell for the at least one wireless device, the access information comprising common random access configuration information associated with one or more beams of associated with the second cell and dedicated random access configuration information associated with one or more beams of the second cell; and
    prepare the access information associated with the second cell to be transmitted to the at least one wireless device;
  wherein the at least one wireless device is configured to:
    receive an RRC connection reconfiguration message from the first network node, the RRC connection reconfiguration message comprising the access information;
    select a beam associated with the second cell based on the access information, the selected beam to be used in a handover from the first cell to the second cell;
    accessing the second cell using the selected beam; and
    transmitting a confirmation message to the second network node indicating that the handover has been completed.

* * * * *

UNITED STATES PATENT AND TRADEMARK OFFICE
CERTIFICATE OF CORRECTION

PATENT NO. : 12,284,558 B2  Page 1 of 1
APPLICATION NO. : 18/395604
DATED : April 22, 2025
INVENTOR(S) : Peisa et al.

It is certified that error appears in the above-identified patent and that said Letters Patent is hereby corrected as shown below:

In the Specification

In Column 1, Lines 6-7, delete "Ser. No. 11/856,466," and insert -- No. 11,856,466, --, therefor.

In Column 1, Lines 8-9, delete "Ser. No. 11/178,587," and insert -- No. 11,178,587, --, therefor.

In Column 1, Line 12, delete "PCT/162017/056880," and insert -- PCT/IB2017/056880, --, therefor.

In Column 1, Lines 40-41, delete "pi ng-pong" and insert -- ping-pong --, therefor.

In Column 7, Line 33, delete "3 rd" and insert -- 3$^{rd}$ --, therefor.

Signed and Sealed this
Tenth Day of February, 2026

John A. Squires
*Director of the United States Patent and Trademark Office*